United States Patent
Vick et al.

(10) Patent No.: US 8,397,219 B2
(45) Date of Patent: Mar. 12, 2013

(54) METHOD AND APPARATUS FOR TRACKING ENREGISTERED MEMORY LOCATIONS

(75) Inventors: Christopher A. Vick, San Jose, CA (US); Gregory M. Wright, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1014 days.

(21) Appl. No.: 12/415,905

(22) Filed: Mar. 31, 2009

(65) Prior Publication Data
US 2010/0250870 A1 Sep. 30, 2010

(51) Int. Cl.
G06F 9/44 (2006.01)
G06F 9/45 (2006.01)
(52) U.S. Cl. .................. 717/131; 717/136; 717/141
(58) Field of Classification Search .......... 717/140–143, 717/130–138
See application file for complete search history.

(56) References Cited

U.S. PATENT DOCUMENTS

| | | | |
|---|---|---|---|
| 5,287,490 A * | 2/1994 | Sites | 717/142 |
| 5,758,051 A * | 5/1998 | Moreno et al. | 714/2 |
| 6,149,318 A * | 11/2000 | Chase et al. | 717/131 |
| 6,243,860 B1 * | 6/2001 | Holland | 717/141 |
| 6,662,360 B1 * | 12/2003 | Hay et al. | 717/131 |
| 6,954,923 B1 * | 10/2005 | Yates et al. | 717/130 |
| 7,260,815 B1 * | 8/2007 | Chen et al. | 717/134 |
| 7,472,383 B2 * | 12/2008 | Long et al. | 717/158 |
| 7,526,758 B2 * | 4/2009 | Hasse et al. | 717/133 |
| 7,596,781 B2 * | 9/2009 | Fulton et al. | 717/137 |
| 7,661,035 B2 * | 2/2010 | DeWitt et al. | 714/45 |
| 7,818,731 B2 * | 10/2010 | Archambault et al. | 717/140 |
| 8,127,280 B2 * | 2/2012 | Thomas et al. | 717/136 |
| 8,141,058 B2 * | 3/2012 | Berg et al. | 717/131 |
| 8,255,880 B2 * | 8/2012 | DeWitt et al. | 717/131 |

OTHER PUBLICATIONS

Marathe et al, "METRIC: Tracking down inefficiencies in the memory hierarchy via binary rewriting", IEEE, pp. 289-300, 2003.*
Agarwal et al, "Efficient dependency tracking for relevant events in shared memory system", ACM PODC, pp. 19-28, 2005.*
Zhou et al, "Dynamic tracking of page miss ratio curve for memory management", ACM ASPLOS, pp. 177-188, 2004.*
Azimi et al, "PATH: page access tracking to improve memory management", ACM ISMM, pp. 31-42, 2007.*

* cited by examiner

*Primary Examiner* — Anil Khatri
(74) *Attorney, Agent, or Firm* — Park, Vaughan, Fleming & Dowler LLP; Mark Spiller

(57) ABSTRACT

Described is a system that tracks enregistered memory locations. The system receives program object code that enregisters a memory location (e.g., a set of data at a given memory address) and executes the program code using a thread. Enregistering memory locations involves using additional registers to cache frequently used memory locations while the object code is executing, these additional registers being available on an architecture on which the program executes, but generally not available on an architecture for which the object code was generated. After enregistering the memory location, the system uses a table that identifies enregistered memory locations to track the associated memory address and a thread identifier for the thread. The system checks this table during memory accesses to ensure that other threads attempting to access an enregistered memory location receive a current value for the enregistered memory location.

19 Claims, 10 Drawing Sheets

METHOD AND APPARATUS FOR TRACKING ENREGISTERED MEMORY LOCATIONS

RELATED APPLICATION

The subject matter of this application is related to the subject matter in a non-provisional application by the same inventors as the instant application that was filed on 12 Jun. 2008, entitled "Method and Apparatus for Enregistering Memory Locations," having Ser. No. 12/138,088.

BACKGROUND

1. Field of the Invention

The present invention generally relates to techniques for improving program performance on computing devices. More specifically, the present invention relates to techniques that improve program performance by tracking memory locations that have been enregistered using additional available registers.

2. Related Art

Binary translation techniques facilitate translating object code targeted for one hardware implementation to execute on another hardware implementation. For instance, such techniques facilitate translating a binary generated for one instruction set architecture (ISA) to a second ISA. While binary translation may involve significant overhead, it allows applications to be run transparently across different architectures without recompilation. Such techniques can simplify distributing program code across a wide range of architectures, and can be extremely useful when access to program source code is restricted.

Note, however, that a compiler typically generates object code to match the feature set of an intended target architecture. For instance, a compiler typically generates code which is optimized for the given number of registers available in the intended target architecture. Note that re-optimizing existing object code to take advantage of the different characteristics of a new target architecture is a complicated process which is typically not performed during binary translation. Hence, binary translation typically does not take full advantage of the resources available in the new target architecture. For instance, when a new target architecture includes more registers than the original intended target architecture, such additional registers may be left unused.

"Enregistering" techniques use such additional registers to cache frequently accessed memory locations, thereby improving performance. However, these enregistering techniques need to ensure that situations where multiple threads attempt to access the same memory location do not violate the correctness of memory sharing. For instance, if a system allows a memory location that was enregistered by a first program thread to be accessed by a second program thread, the second program thread may receive a value that is not up-to-date.

Hence, what is needed is a method that facilitates enregistering memory locations without the above-described limitations of existing techniques.

SUMMARY

One embodiment of the present invention provides a system that tracks enregistered memory locations. During operation, the system receives program object code that enregisters a memory location (e.g., a set of data at a given memory address). Next, the system executes this program object code using a thread. After enregistering the memory location, the system tracks the associated memory address and a thread identifier for the thread in a table that identifies enregistered memory locations. The system checks this table during memory accesses to ensure that other threads attempting to access an enregistered memory location receive a current value for the enregistered memory location.

In some embodiments, the system receives program object code that has been compiled to execute using a register set that is associated with a first hardware implementation. The system then translates this object code to execute on a second hardware implementation that has more registers than the first hardware implementation. During this translation, the system identifies a memory access in the object code, and rewrites one or more instructions associated with this memory access to access an available register instead of the memory location.

In some embodiments, when checking the table on subsequent memory accesses, the system determines whether the memory location being accessed by a subsequent memory access is tracked in the table. If so, the system flushes the value for the enregistered memory location from the register to the memory location.

In some embodiments, the system traps all attempts to access an enregistered memory location. In such embodiments, the system may also support a special store instruction that allows the thread that has enregistered the memory location to bypass a trap handler to directly store an enregistered value to its associated memory location.

In some embodiments, when checking the table on subsequent memory accesses, the system determines whether the memory address being accessed by a subsequent memory access is tracked in the table. If so, the system determines whether a thread identifier associated with the subsequent memory access matches a thread identifier tracked in the table for the memory location. If the two thread identifiers do not match, the system flushes the value for the enregistered memory location from the register to the memory location.

In some embodiments, when flushing an enregistered memory location, the system may:
 trigger a trap that invokes a trap handler;
 prompt the thread that has enregistered the memory location to flush the current value for the enregistered memory location from a register to the memory location;
 allow a second thread that initiated the subsequent memory access to access the flushed value in the memory location, thereby allowing the subsequent memory access to complete; and
 re-enregister the memory location for the original thread.
In an alternate embodiment, the system may disable enregistering for a memory location in subsequent program execution after flushing an enregistered memory location.

In some embodiments, the table is distributed across two or more processing units. The system may distribute and/or replicate entries in the table across these two or more processing units, and then, on subsequent memory accesses, check this distributed table to determine whether a memory location is enregistered.

In some embodiments, the system propagates the memory address and the thread identifier for an enregistered memory location to additional processing units using an extension to a coherence messaging protocol.

In some embodiments, the system uses the table to protect access to enregistered memory locations at the granularity of a memory word or a cache line. Note that the described techniques can be used in conjunction with techniques that provide page-level protection for enregistered memory locations, thereby facilitating the protection of enregistered memory locations for a range of memory granularities.

DETAILED DESCRIPTION

Figure 1:
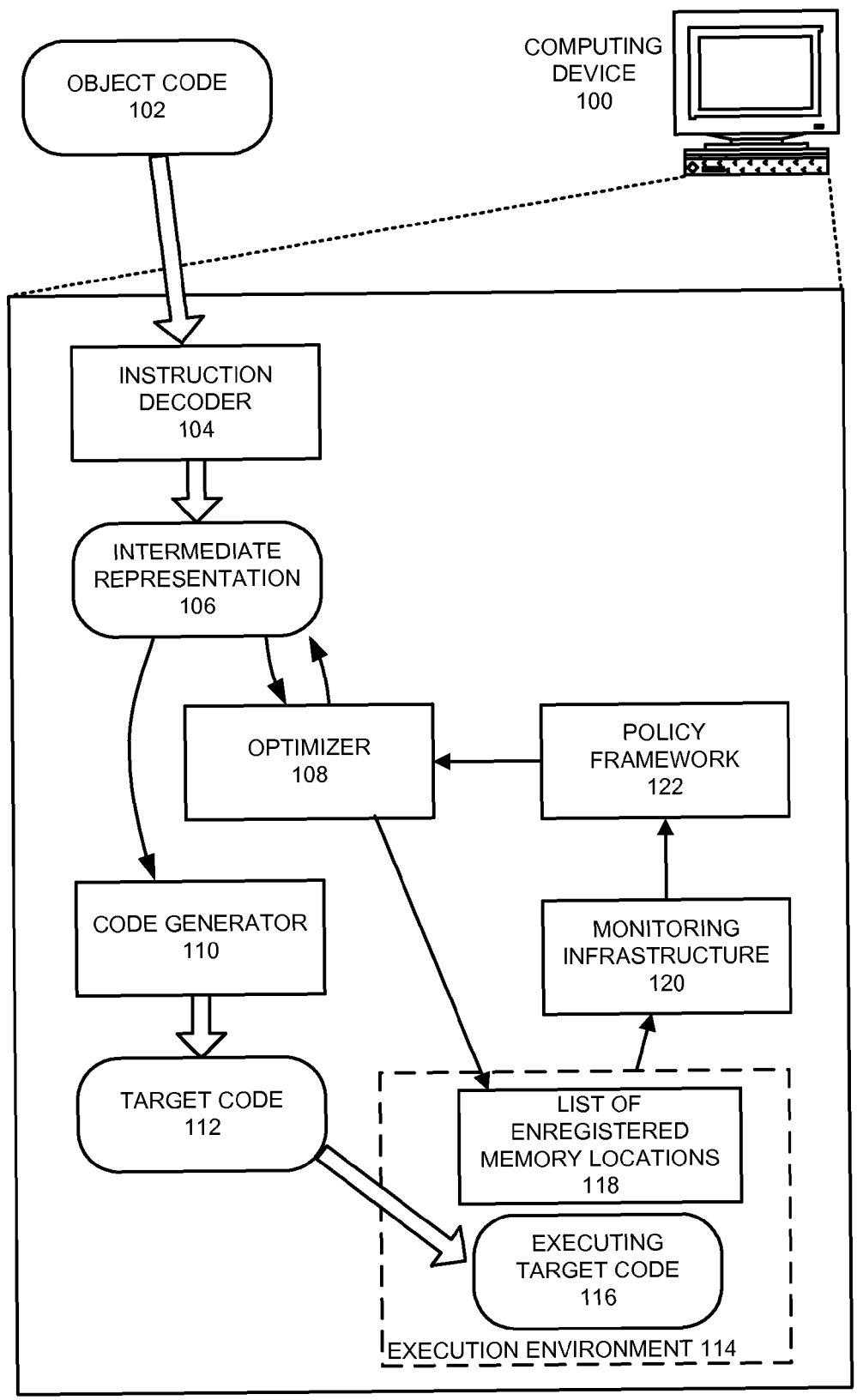
FIG. 1 presents an exemplary process for translating program object code and enregistering one or more memory locations in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other mechanism capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

1. Binary Translation

Processor registers can be accessed much more quickly than main memory storage. Hence, during program execution, a processor typically moves data from a main memory into registers, operates on this data, and then moves results back into the main memory. A program that is compiled to run on a processor that has a small set of available registers may need to access memory more frequently, because insufficient registers are available to store a large set of working values.

Binary translation techniques facilitate translating object code compiled for one hardware implementation (e.g., one ISA) to execute on another hardware implementation. Binary translation allows applications to be run transparently across different architectures without recompilation. Such techniques can simplify distributing program code across a wide range of architectures, and can be extremely useful when access to program source code is restricted.

In some scenarios, the second (target) hardware implementation has more available registers than the original hardware implementation (for which the object code was originally generated). For instance, the object code may have been compiled for a machine with 32 registers (e.g., a SPARC® microprocessor—SPARC is a registered trademark of SPARC International, Inc.), but is to be translated to a second machine with 64 registers. In such scenarios, the performance of the translated code can be improved by using these extra registers to store values that otherwise would require memory accesses (e.g., local variables stored on the stack for a thread).

Note, however, that because a private set of registers is allocated for each thread, "enregistering" such values can cause problems in situations where other threads also need to access the same values. While each thread may be allocated a separate memory region (e.g., for a stack that stores local variables for the thread), these memory regions are typically not protected, and may be accessed by other threads. Note that programs may take advantage of such access capabilities to share information between a set of threads. However, because the set of registers granted to a thread are private to each thread, enregistering memory locations can violate the correctness of such sharing techniques. When a thread updates a register instead of a memory location (e.g., accesses an enregistered memory location), other threads that depend on the thread updating the memory location cannot see the updated value that has been written into the register. In order to preserve program semantics and the machine memory model of the emulated hardware, the system needs to ensure that accesses to enregistered values by other threads see the updated values stored in such registers.

2. Enregistering Memory Accesses

In one embodiment of the present invention, the system uses additional available registers in a target hardware implementation while preserving the memory model semantics for the program (from the context of the original hardware implementation). By using the additional available registers to store values that would otherwise be stored in memory, the system reduces memory traffic and reduces the access latency for such values. Hence, the described techniques improve program performance with minimal hardware and operating system modification. In an environment where a virtual machine performs dynamic binary translation, such changes are only visible to the virtual machine, and do not impact the operating system or the applications. Hence, the described system reduces the performance overhead of dynamic binary translation by speeding up the execution of translated programs.

In one embodiment of the present invention, the system tracks and/or moderates access to enregistered memory locations to detect attempts by other threads to access the memory location. Note that while a first thread may be able to access a memory region (e.g., a memory page) allocated to another thread (such as the second thread's local stack), such accesses are generally uncommon in practice, and the bulk of accesses to such a memory region will be by the thread that "owns" (e.g., is explicitly associated with) the memory page. While program analysis cannot prove that other threads will not attempt to access such memory pages, the system can be speculatively optimized for the common case where only the owning thread accesses such a memory page. For instance, the system can use page-access restrictions to protect such memory pages and ensure that the system detects and correctly manages any attempted access by other (non-owning) threads. For example, the system may trigger a page-protection fault in response to an attempted access of a page by a non-owning thread. During this fault, the system can execute additional instructions that write a current value stored in an associated register back into an enregistered memory location, thereby ensuring that the accessing thread receives the correct value for the enregistered memory location.

Note that multiple threads in the same process may simultaneously execute instructions from the translated object code. Hence if a given instruction in the object code has been rewritten to enregister an associated memory location from a thread's stack, this instruction will be replaced with a corresponding instruction which performs a register access in the context of both threads. However, the two sets of accesses do not overlap or cause any problems (e.g., contention), because the operating system typically allocates a separate memory page for each thread's local stack, and each thread is granted a separate (private) set of registers. Hence, both threads can simultaneously enregister the values in their respective local stacks using an available register.

FIG. 1 illustrates an exemplary process for translating program object code and enregistering one or more memory locations. During operation, computing device 100 receives program object code 102 that has been compiled for a hardware implementation other than that of computing device 100. Object code 102 is received by instruction decoder 104, which decodes the instructions of object code 102 to create an intermediate representation 106 of the program. Optimizer 108 determines whether any additional registers are available, and if so, analyzes intermediate representation 106 to identify memory locations that can be enregistered. For instance, optimizer 108 may perform program analysis (e.g., by performing static code analysis, or by receiving profiling input generated during dynamic program analysis) to determine the set of memory locations that, when enregistered, are likely to most benefit program performance. Optimizer 108 then iteratively rewrites instructions in intermediate representation 106 to access the available registers instead of the memory locations. Note that multiple instructions may be rewritten to use a given available register. For instance, the system may rewrite two or more distinct load and/or store operations to the same memory address to access a single available register. Note that the system may also rewrite two or more complementary instructions that are associated with a single memory access. For instance, the original object code may include a two-instruction sequence that first computes a memory address, and then accesses the computed memory address. If this memory access is replaced by a register access, the first instruction may no longer be needed (although the page fault handler may still need to perform the address calculation in cases where the value in the register needs to be flushed to the memory location). Hence, a single enregistered memory location may replace a substantial number of instructions and/or memory operations for each available register, thereby magnifying the performance improvements of the described techniques.

After optimizer 108 has finished enregistering an initial set of memory locations (e.g., by using all of the available registers or running out of memory accesses to enregister), code generator 110 generates target code 112, which can execute on the underlying hardware of computing device 100. Note that while this example assumes target code 112 has been generated to execute on computing device 100, this process may also be performed to translate object code 102 to execute on a third machine (not shown) with yet another hardware implementation. After generating target code 112, the system can execute target code 116 in execution environment 114, which is aware of the set of enregistered memory locations 118. While executing target code 116, the system moderates accesses to these memory locations to ensure that threads attempting to access enregistered memory locations do not access stale values.

Note that the process for choosing memory locations to enregister is a policy choice. While the described techniques allow the system to enregister any memory location, the system may use a range of policies to determine the actual memory locations that are enregistered. For instance, the system may use runtime profiling techniques to identify frequently accessed memory locations whose contents should be stored in registers to improve program performance. As mentioned above, such techniques may be applied statically (prior to execution) to predict appropriate memory locations to enregister and/or dynamically ("on-the-fly") while monitoring program behavior to determine and enregister the most-frequently accessed (unshared) memory locations.

FIG. 1 also illustrates how the system may use monitoring infrastructure 120 to perform ongoing monitoring and profiling for enregistered memory locations, and further optimize intermediate representation 106 and target code 112. For instance, if a large number of other threads access an enregistered memory location for a given thread, the system may de-optimize the associated memory location by rewriting the associated instruction to revert to using the memory location instead of a register. Alternatively, the system may determine that an enregistered memory location is not used very frequently, and that enregistering a different memory location might result in a more substantial performance improvement. In this case the system may undo the previous optimization, and enregister a different memory location. Such decisions may be determined using policy framework 122, which receives input from monitoring infrastructure 120 and feeds decisions into optimizer 108. Note that such adjustments can occur while executing target code 116, which can be updated with a modified version of target code 112 during execution.

Note that some mechanism is needed to track the set of enregistered memory locations, for instance to enable later modifications and/or adjustments as well as to determine whether a register needs to be flushed for a subsequent memory access. The set of enregistered memory locations may be tracked and updated using different techniques. For instance, the enregistered memory locations may be annotated in intermediate representation 106. Alternatively, the set of enregistered memory locations could be stored in a separate list (or table) that is passed to or maintained by the optimizer 108 and/or execution environment 114.

Figure 2:
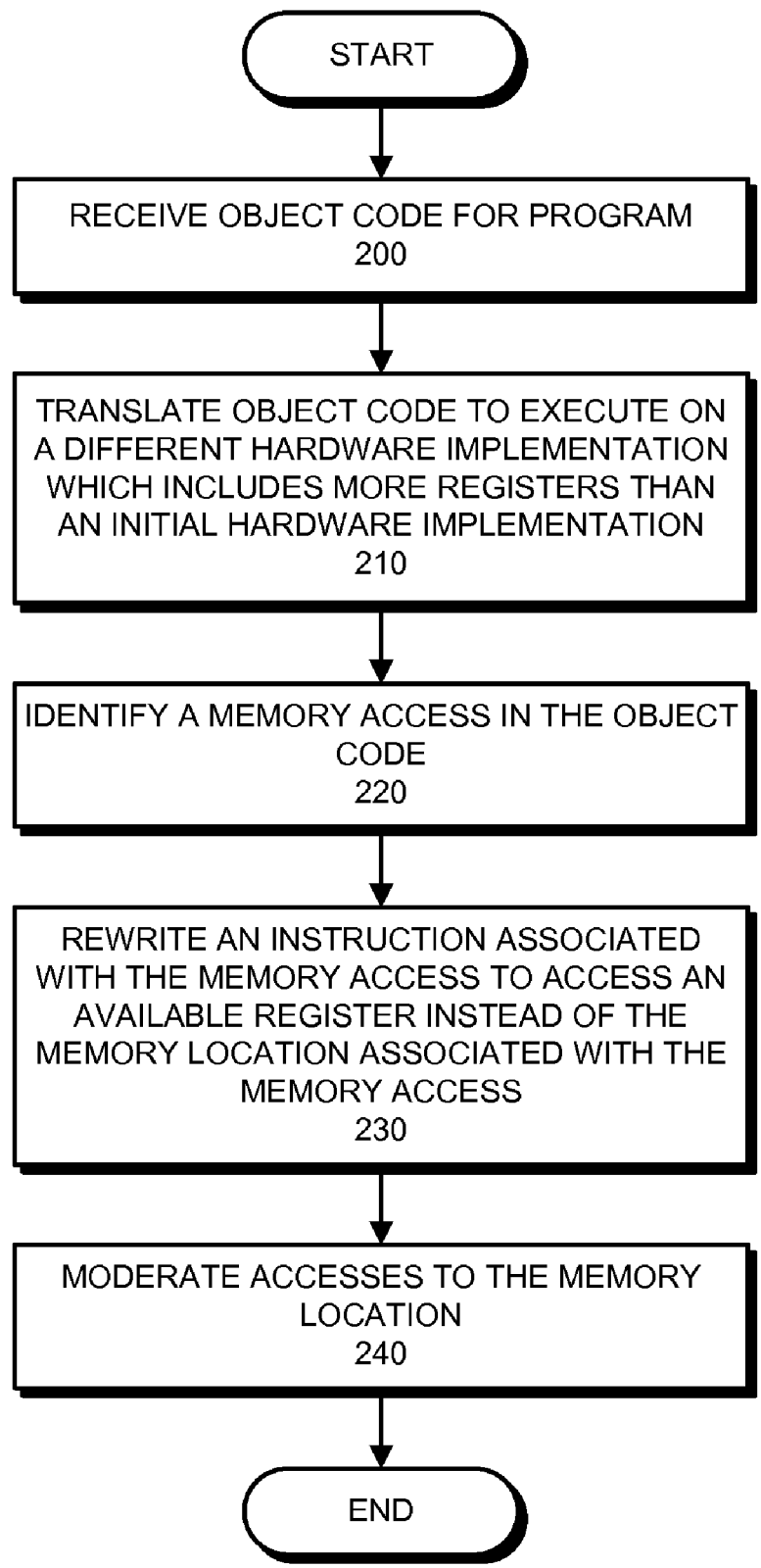
FIG. 2 presents a flowchart illustrating the process of enregistering a memory location in accordance with an embodiment of the present invention.

FIG. 2 presents a flowchart illustrating the process of enregistering a memory location. During operation, the system receives program object code which has been generated for a given hardware implementation (operation 200). The system translates this object code to execute on a second hardware implementation which includes more registers than the initial hardware implementation (operation 210). The system makes use of such an additional register to improve the performance of the translated object code for the second hardware implementation. Specifically, the system identifies a memory access in the object code (operation 220), where the memory access is associated with a memory location. The system then rewrites an instruction associated with this memory access to access the available register instead of the memory location (operation 230). To preserve program semantics, the system subsequently tracks and/or moderates accesses to the memory location (operation 240) to ensure that no threads access a stale value in the enregistered memory location.

Note that tracking and/or moderating accesses to an enregistered memory location can be achieved using a variety of techniques, each of which uses different mechanisms and operates at different granularities. The following sections describe two such techniques.

3. Page-Level Monitoring of Enregistered Memory Values

In one embodiment of the present invention, the system detects attempts to access enregistered memory locations at a per-page-level by using extra bits in a page-table entry of a translation lookaside buffer (TLB). For instance, the system may extend page-table entries to also store an identifier (ID) that indicates which thread "owns" the page, and can restrict other threads from accessing the page. Typically, a memory location is either writable by any thread or marked to be read-only. The system extends the TLB so that when an ID is present in a TLB entry, the system read- and write-protects the associated page against access by any thread other than the thread associated with the ID. When another thread attempts to access an enregistered memory location in a protected page, the system pauses execution of the other thread and notifies the thread that owns the page that a value that is stored in a register needs to be flushed to the associated memory location. After this value has been written to the memory location, the system removes the page protection and allows the paused thread to continue.

Note that including IDs in TLB entries allows IDs to be checked during the address-translation process, and facilitates using existing page protection mechanisms to also protect enregistered values from other threads. Augmenting TLB entries with such identifiers supports the described techniques while requiring minimal additional hardware (e.g., an additional set of bits in each TLB entry and an additional compare operation during address translation).

Note also that the number of bits that need to be added to TLB entries to identify threads may vary based on the type of identifier used. Some embodiments of the invention may identify threads using a thread ID assigned to the thread by the operating system. However, because an operating system may support a large number of software threads, many bits may be needed to store such thread IDs. For instance, the operating system may identify threads using a 16-bit or 32-bit thread ID. Hence, storing such a thread ID in the TLB may require a large number of additional bits to be added to each TLB entry.

To alleviate this problem, one embodiment of the present invention identifies threads using a strand ID for the identifier (instead of the thread ID assigned by the operating system). Note that strands are sets of hardware constructs and resources that support (software) threads. During execution, threads execute and perform computations using the underlying hardware resources of an associated strand. The operating system time-slices threads to strands, for instance by assigning one or more strands to a task and then mapping threads to be executed for the tasks onto the strands. Note that while the number of threads available on a machine is only strictly limited by the size of the address space (e.g., a 32-bit architecture limits the system to an absolute maximum of $2^{32}$ thread IDs), the number of strands for a machine is limited for a given hardware implementation. For instance, each core in a multi-core processor might include eight hardware strands that all feed into a shared TLB. The set of strands is fixed and limited, and only threads that are actively mapped onto a strand can currently execute (and thereby access pages). Hence, the system can distinguish between the active threads in the system using the much smaller strand ID (instead of the thread ID) as an identifier in TLB entries. For instance, in the case of a system that supports seven hardware strands per core, only three additional bits need to be added to each TLB entry (in contrast to 32 bits for an operating system with 32-bit thread IDs). Hence, some embodiments of the system can use a strand ID as an identifier to reduce the size of identifiers that need to be stored in the TLB. Note that both a thread ID and an associated strand ID (for a thread executing on the resources of a strand) may be maintained in state associated with the strand, and may hence be readily available for comparison operations if needed.

In an alternative embodiment, on a single-stranded processor core, or when the TLB is not shared between strands, the system can compare identifiers without including extra bits in the TLB entries. Because only a single strand can access the TLB entries, the system already knows that only one strand (e.g., the only available strand which can access the TLB) is associated with the TLB entries, and thus does not need to store an ID for this strand in each of the TLB entries. Hence, the system can simply compare the identifier of another strand attempting to access an enregistered memory location with the identifier of the strand which has enregistered that location at the time that the other strand installs an entry in its TLB. Note that this is different from a shared TLB, where one thread may access a TLB entry for a page associated with another thread (thereby motivating the need for the system to compare the accessing thread's ID with the identifier in the TLB entry being accessed).

Figure 3:
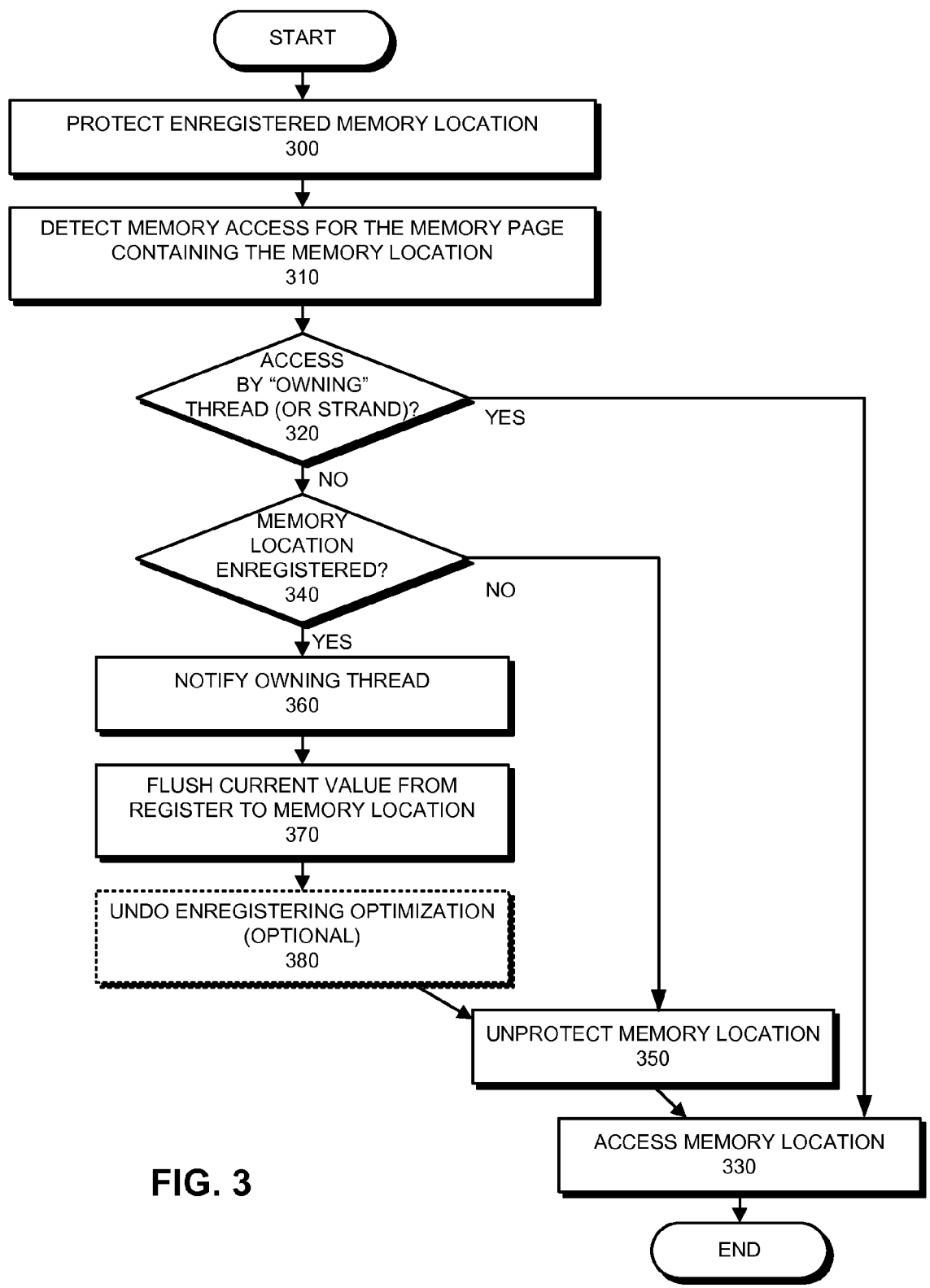
FIG. 3 presents a flowchart illustrating the process of accessing an enregistered memory location in accordance with an embodiment of the present invention.

FIG. 3 presents a flowchart illustrating the process of accessing an enregistered memory location. During operation, the system protects an enregistered memory location (operation 300), for instance by writing an identifier for the thread associated with the memory page containing the memory location into a TLB entry for the memory page and then setting one or more access control bits for the memory page to ensure that accesses by other threads will trigger a page fault. Subsequently, the system detects a memory access for the memory page containing the memory location (operation 310). The system then determines whether this access is being requested by the thread that is associated with the memory page (operation 320), for instance by comparing the identifier in the TLB entry with an identifier for the accessing thread while translating the address for the memory location. If so, the system allows the memory location to be accessed (operation 330), and the process completes. On the other hand, if the accessing thread is not the thread associated with the memory page, the attempt to access the protected page triggers a page fault, during which the system checks whether the specific memory location addressed by the access attempt is an enregistered memory location (operation 340). If the memory location is not enregistered, the value in the memory location is current, and the system can unprotect the memory location (operation 350) to allow the memory location to be accessed (operation 330). If, however, the memory location is enregistered (operation 340), the system notifies the owning thread (operation 360), which then flushes the current value in the register to the memory location (operation 370). (Alternatively, the system may directly update the memory location with the current value without notifying the owning thread). At this point, the system may also (optionally) undo the enregistering optimization for the memory location (operation 380) (e.g., if the system determines that the memory location is likely to be accessed again by non-owning threads). Finally, after the register's current value has been flushed to the memory location, the system can unprotect the memory location (operation 350) to allow the updated memory location to be accessed (operation 330).

Note that the system only momentarily unprotects a memory page during an attempted access by a non-owning thread. For instance, during the page fault, the system may temporarily unset the access control bits for the memory page to allow an accessing thread to access a memory location. However, after the value at the memory location has been read (while still handling the page fault), the system may immediately re-protect the page to ensure that subsequent accesses by other threads cannot directly access memory locations in the memory page, and will trigger another page fault. Note also that when multiple enregistered memory locations occur in the same memory page, the system may flush the register values for all of these memory locations during the page fault (and prior to the access), to ensure that no stale values are read.

In summary, one embodiment of the present invention facilitates monitoring enregistered memory locations on a per-page granularity. The following section describes alternative techniques that facilitate monitoring enregistered memory locations at a granularity smaller than memory pages.

4. Fine-Granularity Monitoring of Enregistered Memory Values

While the techniques described in the previous section facilitate tracking enregistered memory locations in a multi-threaded environment using memory-page-based techniques, another set of techniques facilitates monitoring enregistered memory values at a granularity finer than that of memory pages. In one embodiment of the present invention, the system uses an additional table of information (referred to as a "readset table") in the memory management unit (MMU) of a processor to perform fine-granularity monitoring of enregistered memory locations in a multi-threaded environment. More specifically, the system maintains data in this table for each enregistered memory location, including: 1) the memory address of the enregistered memory location; and 2) the thread identifier for the thread that has enregistered the memory location. During memory accesses, the system checks this table to determine whether a given memory location being accessed is enregistered. These fine-granularity tracking techniques facilitate tracking enregistered memory locations without blocking access to all of the other memory locations in the same memory page as an enregistered memory location.

In one embodiment of the present invention, enregistering a memory location involves executing an instruction that stores into the readset table the address of a memory location and the thread identifier of a thread that is enregistering the memory location. The system then checks whether each subsequent memory access (including both read and write accesses) attempts to access the enregistered memory location. For instance, the system may perform an additional lookup on every memory access to check whether the memory address being accessed is stored in the readset table. If so, and if the thread identifier (TID) for the accessing thread is different from the TID stored in the table for the enregistered memory location, this attempted access results in a trap. The trap handler uses the stored TID to identify and then notify the optimized thread (that enregistered the memory location) that the enregistered value needs to be written back to the memory location. In response, the trap handler for the optimized thread flushes the value stored in the (extra) register back into the memory location, thereby allowing the subsequent memory access to complete using the most up-to-date value for the memory location.

In some embodiments, the system traps all subsequent memory accesses to an enregistered memory location, regardless of the TID of the thread accessing the memory location. During program translation, a dynamic compiler that enregisters a memory location rewrites all accesses to that memory location to be register accesses. Thereafter, the newly optimized thread will not be accessing that memory location again except when: 1) the optimizing thread no longer needs the memory location to be enregistered; 2) the optimizing thread wants to explicitly make the new value available to other threads; or 3) another thread attempts to access the memory location. Hence, the system's control logic can be simplified to trap all subsequent accesses for that memory location (thereby eliminating any need to perform additional comparisons of TIDs).

Note, however, that an optimized thread needs to be able to write the register value for an enregistered memory location back to the memory location at some point (without trapping) to terminate the enregistering optimization. Simply releasing the protection and then performing the store is not a viable option, because another thread might access an out-of-date value from the memory location in the time between the release and the subsequent write. In some embodiments, the processing unit executing the program supports a special non-trapping "superstore" instruction that can write enregistered memory locations without triggering a trap. The dynamic compiler can insert this instruction to write back a value to an enregistered memory location (e.g., either at the end of a code section in which a memory location has been enregistered, or in a trap handler when an enregistered value needs to be written back to its associated memory location).

In some embodiments, the system un-enregisters an enregistered memory location by executing a "clear" instruction that finds and "clears out" (e.g., writes a zero or some other well-known value to) an entry in the readset table associated with the enregistered memory location. For instance, the dynamic compiler may insert such a clear instruction after a superstore instruction to first flush the value back to the memory location and then indicate in the table that the memory location is no longer enregistered.

As mentioned above, the system traps when a thread attempts to access a memory location that was enregistered by another thread. In some embodiments, servicing this trap may involve prompting the optimized thread (using the TID stored in the readset table for the enregistered memory location) or a trap handler for the optimized thread to flush an enregistered value back to the memory location. In some embodiments, the optimized thread may flush all enregistered values back to their corresponding memory locations or may flush back only the enregistered value for the specific memory location that triggered the trap. The system then clears the corresponding entry(s) in the table to allow the subsequent access (by the thread that triggered the trap).

In some embodiments, the interrupted optimized thread may either re-enregister a memory access after the subsequent memory access completes, or may continue executing in a "de-optimized" fashion (e.g., accessing the value from the memory location rather than in a register). The system may determine which of these two options to take on a case-by-case basis, by weighing a set of performance trade-offs. For instance, if the memory access occurs frequently, is in the critical path of program execution, and the memory location is not accessed often by other threads, the system may choose to re-enregister the memory location. Alternatively, if the memory location has high contention, and the system determines that that a significant amount of time has been spent in the trap handler for enregister and un-enregister operations, the system may choose to not re-enregister a memory location.

Figure 4A:
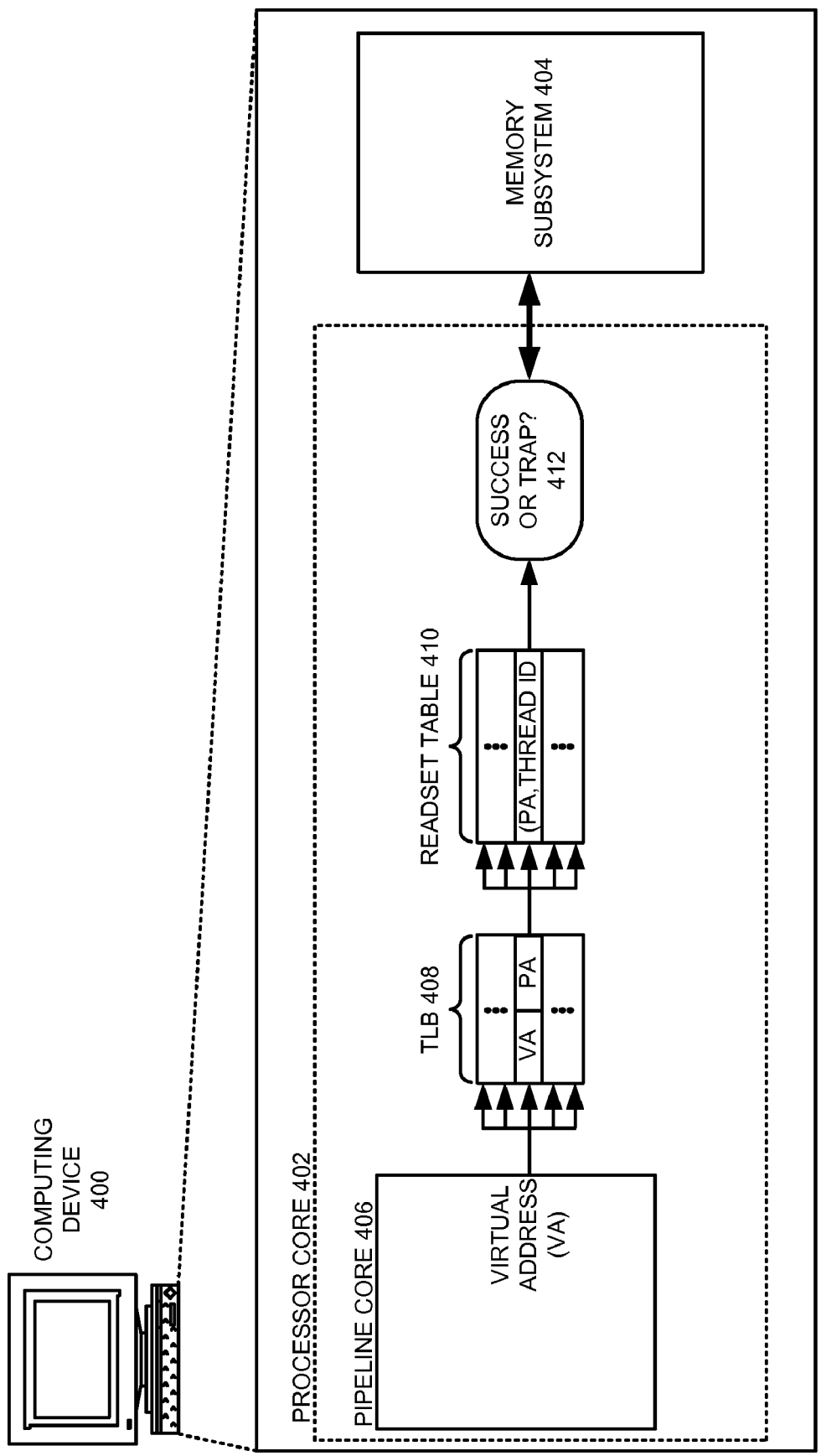
FIG. 4A illustrates an exemplary computing device that uses a readset table to track enregistered physical memory addresses in accordance with an embodiment of the present invention.
Figure 4B:
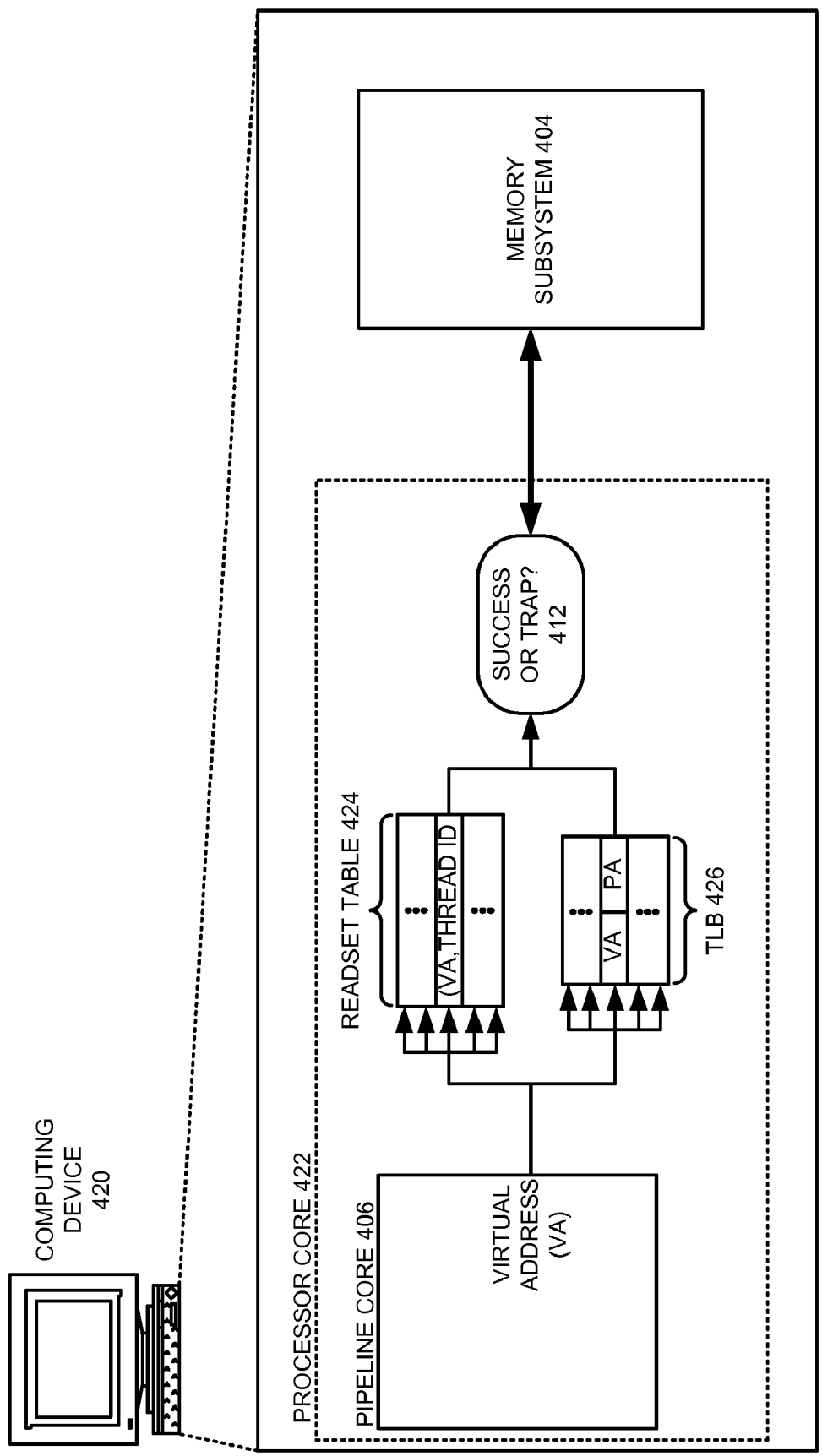
FIG. 4B illustrates an exemplary computing device that uses a readset table to track enregistered virtual memory addresses in accordance with an embodiment of the present invention.

FIGS. 4A-4B illustrate two exemplary computing devices that include a readset table. In FIG. 4A, computing device 400 includes a processor core 402 and a memory subsystem 404. Programs executing in the pipeline core 406 of processor core 402 operate upon virtual addresses (VAs). During a memory access, the device translates such VAs into physical addresses using a translation lookaside buffer (TLB) 408. Note that if the system cannot find a matching entry in TLB 408 for a given VA, it may need to access a set of supporting page table structures and/or mechanisms (not shown) to load the virtual-to-physical mapping needed for the translation into TLB 408.

After translating the VA into a physical address (PA), the system checks whether an entry in readset table 410 contains this PA to determine whether to proceed with the memory access or perform a trap (operation 412). Each active entry in readset table 410 contains a memory address for an enregistered memory location and the thread identifier of the thread that enregistered the memory location. If the memory address being accessed is not present in readset table 410, the memory access can proceed uninterrupted. If, however, the memory address being accessed is present in readset table 410, the system may need to perform additional checks and/or a trap (as described above).

FIG. 4B illustrates a second exemplary computing device 420. Processor core 422 includes the same components as processor core 402 (in FIG. 4A), but in a different layout. In processor core 422, readset table 424 stores VAs instead of PAs, and the system checks whether the VA being accessed is present in readset table 424 in parallel with the TLB 426 translation. After performing the check the system again determines whether to proceed with the memory access or perform a trap (operation 412).

Note that the table structures used for the readset tables illustrated in FIGS. 4A-4B (410 and 424) may be content-addressable memories (CAMs) that are similar in functionality to the compare mechanisms used in a TLB. In a CAM every entry includes an associated comparison circuit, which allows a memory address to be compared to all of the monitored (enregistered) memory locations in parallel. These comparison circuits can dissipate substantial power, motivating system designers to keep readset tables small, if possible.

In some embodiments of the present invention, the system may monitor and protect memory regions of different sizes using a readset table. For instance, in some embodiments an entry in the readset table may track either an individual memory word that has been enregistered or an entire cache line that contains the enregistered memory location. In some embodiments the system may simultaneously protect different size memory regions, and adjust the number of bits that are compared for each table entry on a memory access depending on the size of the memory region being tracked. Note the size of a cache line often varies based on the cache size and architecture, but is typically much smaller than the size of a memory page (e.g., a 64-byte cache line vs. a 4 KB or larger memory page). In general, techniques that use a readset table to protect and monitor enregistered memory locations provide a much finer granularity that the above-described techniques that operate on the granularity of memory pages.

Figure 5:
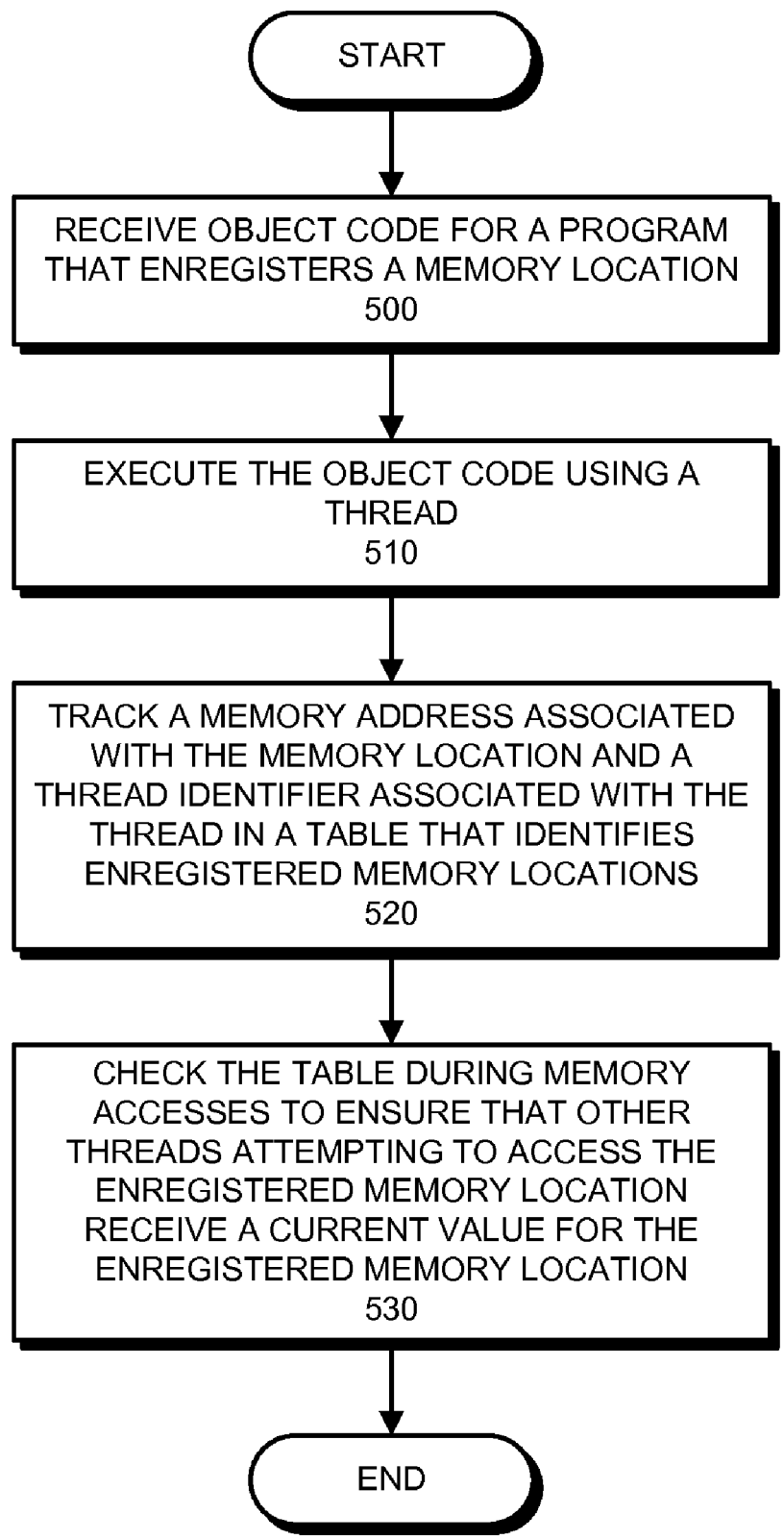
FIG. 5 presents a flowchart illustrating the process of tracking enregistered memory locations in accordance with an embodiment of the present invention.

FIG. 5 presents a flowchart illustrating the process of tracking enregistered memory locations. During operation, the system receives object code for a program that enregisters a memory location (operation 500), and executes this object code using a thread (operation 510). While executing the object code, the system tracks a memory address associated with the memory location and a thread identifier associated with the thread in a table that identifies enregistered memory locations (operation 520). The system checks this table during memory accesses to ensure that other threads that attempt to access the enregistered memory location receive a current value for the enregistered memory location (operation 530).

4.1 Tracking Enregistered Values Across Multiple Processing Elements

In some embodiments, multiple processor cores in a multi-core system (or multiple processing units in a symmetric multiprocessor (SMP)) that share a memory system need to communicate enregistered memory locations to each other. Every processing unit that translates memory addresses needs to ensure that a given memory location being accessed has not been enregistered by a thread (or strand) in another processing unit. A number of techniques can be used to provide this assurance.

In one embodiment, the memory addresses and TID values for enregistered memory locations are automatically replicated to readset tables in each processing unit. For instance, the memory addresses and TID values can be stored in registers in the memory management unit (MMU) of a processor core. Whenever updating the readset table in an MMU in response to an instruction that performs an enregistering operation, the system can propagate the resulting updates to the readset tables in all the other MMUs in the same coherence domain by using an extended coherence messaging protocol. Hardware in each MMU can monitor coherence traffic by snooping the coherence messages to detect all accesses to memory addresses (commonly referred to as the "read set").

Note, however, that as mentioned above a readset table involves substantial hardware and power cost. Replicating values across each processing unit will typically increase the size of the readset table needed in each processing unit, thereby increasing this cost. In an alternative embodiment, the system may extend a coherence messaging protocol to propagate checks to multiple readset tables in parallel instead of replicating values in each readset table.

Figure 6:
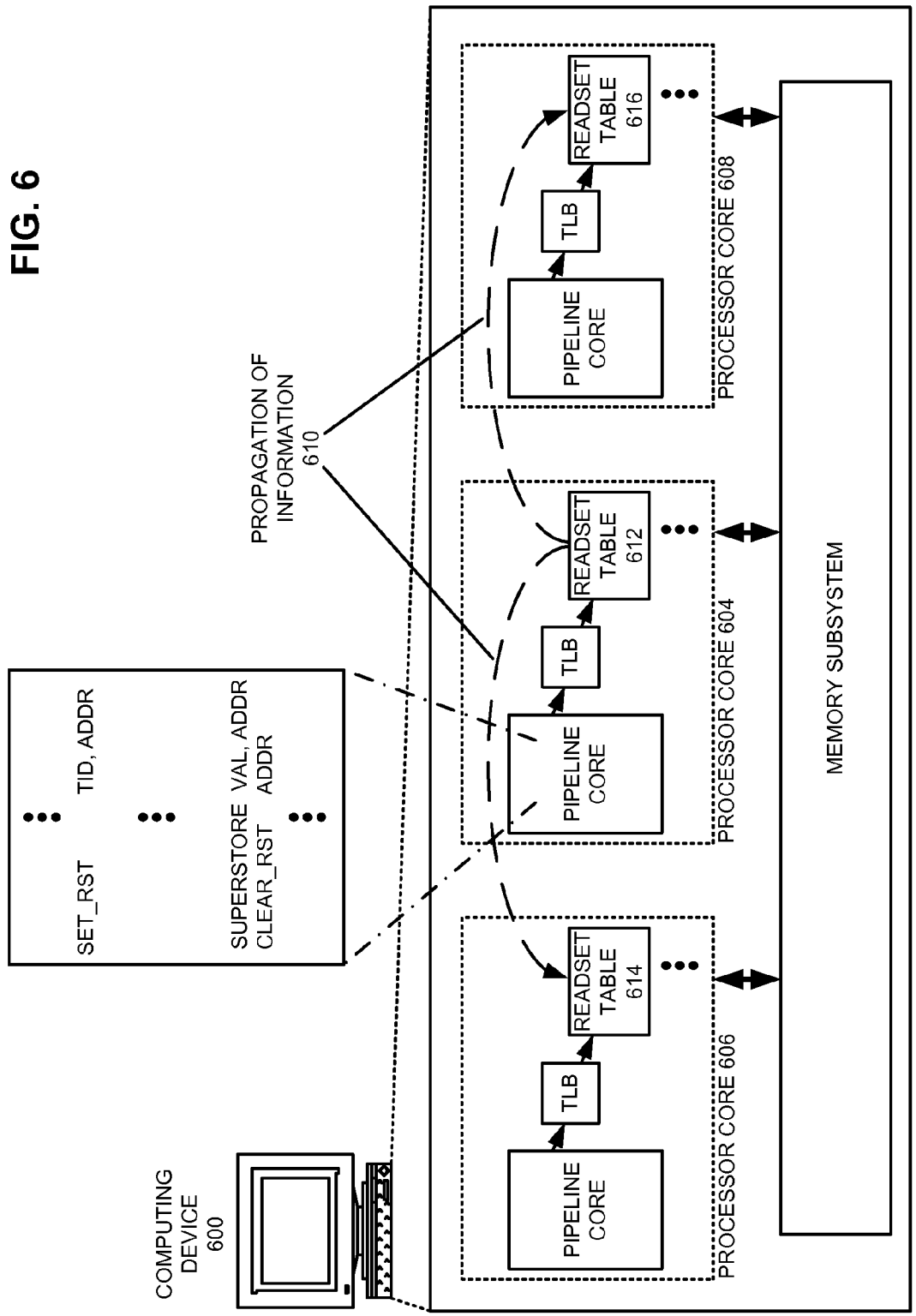
FIG. 6 illustrates a multi-core computing device that uses a messaging protocol to propagate information about enregistered memory locations to multiple readset tables in accordance with an embodiment of the present invention.

FIG. 6 illustrates a multi-core computing device 600 that uses a messaging protocol to propagate information about enregistered memory locations to multiple readset tables. While performing binary translation, a dynamic compiler inserts special enregistering-related instructions into program object code, thereby creating a code segment with enregistering-related instructions 602. These instructions include: 1) an instruction ("SET_RST," or "set readset table") that enregisters a memory location by placing a memory address ("ADDR") and a TID into a readset table immediately prior to loading the value from the memory address into a register; 2) an instruction ("SUPERSTORE") that stores a value ("VAL") to the enregistered memory address ("ADDR") without triggering a trap; and 3) an instruction ("CLEAR_RST," or "clear readset table") that releases the entry in the readset table immediately after the enregistered value has been written back to the memory location.

When executing code segment 602 in processor core 604, the system updates readset table 612. In some embodiments, the resulting table entry is propagated 610 to (and replicated in) readset tables 614-616 in processor cores 606-608, respectively, and then subsequently deleted from all of readset tables 612-616 when the memory location is no longer enregistered. Note that, timing-wise, the system needs to ensure that a replicated table entry has propagated to all other processor cores prior to a subsequent store to the corresponding memory location. Two parallel messages (by different processor cores) for the same memory location can be handled using a range of resolution techniques. For instance, if two threads on different processor cores attempt to enregister the same memory location, one technique may detect and resolve such a collision in a trap handler at a point in time that one of the two threads attempts to write a value back to the enregistered memory location.

In an alternate embodiment, instead of propagating the table entry, processor cores 604-608 instead propagate each memory address being accessed to the other processor cores 610, so that all of processor cores 604-608 can use their respective readset tables 612-616 to confirm that the memory address is not enregistered. This embodiment does not require table entries to be replicated, but may generate substantial additional messaging traffic and delay (depending on the number of memory accesses in the program).

In some embodiments, the system uses a cache that is shared by multiple processing elements to detect and signal collisions for enregistered memory locations. For instance, in a system where processing units include individual level-one (L1) caches and share a level-two (L2) cache, a processing unit performing a store operation places a value and the memory address to which the value will be stored into a store queue. The contents of this store queue are then eventually written out to the shared L2 cache. The L2 cache tracks the memory regions that are stored in each individual L1 cache, and if a memory address being written by a first processing unit is in the L1 cache of a second processing unit, the shared L2 cache sends a message to invalidate the corresponding L1 cache line of the second processing unit. The system can use an extended messaging system to compare memory locations being written into the shared L2 cache with the memory addresses stored (for enregistered memory locations) in the readset table of each processing unit. For instance, the shared L2 cache can, at the time it receives a store request from a store queue, send a message to each processing unit to ensure that the memory address being written is not in a readset table, and if it is, roll back execution on the processing unit that is the source of the store.

Figure 7:
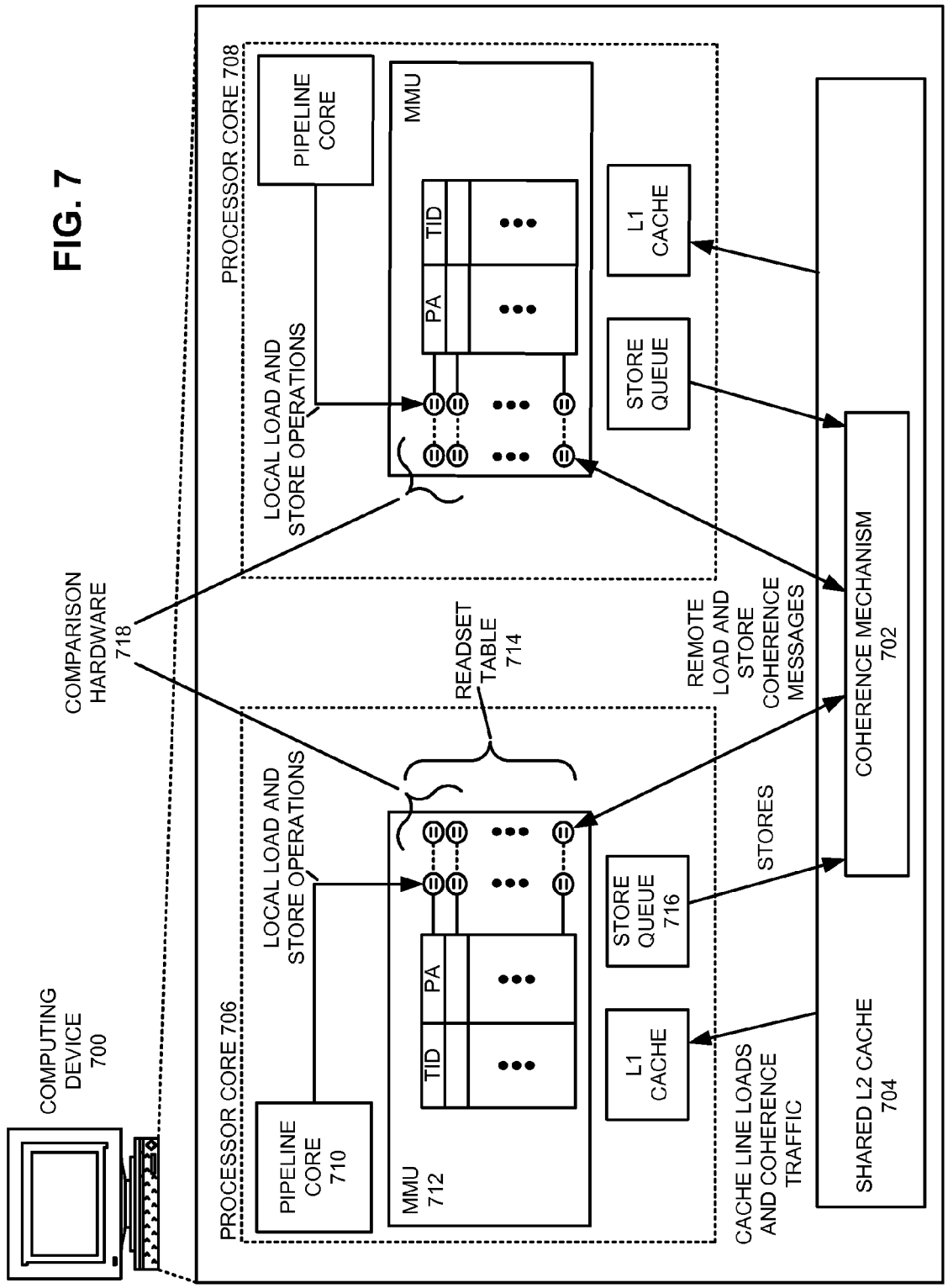
FIG. 7 illustrates a multi-core computing device in which a coherence mechanism in a shared cache facilitates detecting conflicts with enregistered memory locations in accordance with an embodiment of the present invention.

FIG. 7 illustrates a multi-core computing device 700 in which a coherence mechanism 702 in a shared L2 cache 704 facilitates detecting accesses of enregistered memory locations. A memory access for a store instruction performed by pipeline core 710 of processor core 706 is received by MMU 712, which compares the PA and TID associated with the memory access with the entries in readset table 714. If the memory address being written to is not enregistered on processor core 706, the value being written and the memory address are sent on to store queue 716, which eventually writes the values back to shared L2 cache 704. Upon receiving the store request, coherence mechanism 702 of shared L2 cache 704 sends a remote load/store coherence message (containing, in this case, the memory address being written) to the other processing units (e.g., processor core 708) in computing device 700. A processing unit receiving such a coherence message checks whether the received memory address is present in its local readset table (e.g., if the memory address is enregistered locally) and, if so, sends a return message to shared L2 cache 704. The fact that another processing unit has enregistered the memory location indicates that the processing unit whose store triggered the remote coherence message was using an out-of-date (unenregistered) value from the enregistered memory location, and needs to roll back execution. Note that the comparison hardware 718 of each readset table may contain two sets of comparators for each readset table entry: one set of comparators that are used to compare memory addresses for local load and store operations; and a second set of comparators that can be used in parallel to compare memory addresses for remote load and store operations.

Note that integrating coherence checks for enregistered memory addresses into a shared cache can introduce additional hardware and software complexity. For instance, the latest time at which a typical modern processor pipeline can throw an exception for a memory access is typically at the time of a page fault (e.g., when the MMU of a processing unit translates a memory address). Including the readset table in the MMU enables traps related to enregistered memory locations to occur in the same time frame as an address translation exception. However, traps triggered in response to remote coherence messages sent by a shared L2 cache would occur well after this time frame, at a point when a memory address has already been translated and sent on to the memory hierarchy. Handling traps at such a late stage may involve either delaying the commit of stored values or an additional buffer mechanism that facilitates rolling back program execution to a point previous to a committed store, both of which may involve additional hardware.

5. Tracking Enregistered Memory Values at Multiple Granularities

Note that the techniques described for page-level and fine-granularity tracking of enregistered memory values are not mutually exclusive, and may be used together simultaneously to protect enregistered memory locations. While the different techniques described have similar goals (e.g., tracking enregistered memory locations), they involve different mechanisms and cost-benefit trade-offs in terms of hardware and software complexity. For instance:

Fine-granularity techniques that replicate readset table entries across multiple processing units may lead to a distributed table size that grows quadratically with the number of hardware strands in the system (e.g., the number of hardware strands per processor core times the number of processor cores in the computing device), and hence in some scenarios may have a high associated hardware cost.

Fine-granularity tracking techniques that include messaging techniques and/or cache-based tracking techniques may reduce the size of readset tables, but involve complicated messaging and roll-back mechanisms. For example, a roll-back mechanism may reduce the size of the CAMs needed for a readset table, but may also involve adding additional static random access memory (SRAM) for a roll-back buffer. Hence, choosing between the two techniques may involve a choice between reducing area or power use.

Page-based tracking techniques may involve less additional hardware complexity (e.g., by only requiring a small number of bits to be added to each TLB entry), but a larger granularity of protection for memory regions containing enregistered memory locations may cause more traps, thereby increasing software overhead and reducing program performance.

In some embodiments of the present invention, the techniques that are used to track enregistered memory locations vary based on the microarchitecture and predicted workload for a computing device. For instance, replicating the readset table entries may provide performance benefits with a relatively low hardware cost in a microarchitecture with a small number of large, powerful cores, where the readset table comprises only a small percentage of the hardware area. However, a microarchitecture that includes a large number of small and simple processor cores may use page-level granularity to avoid having to add a readset table to each processor core. Some intermediate microarchitectures may include both a small readset table and a page-level tracking mechanism in each processor core. This organization facilitates tracking both large memory regions (e.g., the private stack of a thread, which is typically large, and unlikely to be accessed by others) as well as very small memory regions (e.g., a small set of enregistered static variables that are distributed across memory).

In some embodiments of the present invention, a dynamic compiler for a computing device that supports multiple granularities of protection for memory regions may determine the granularity with which two or more memory regions will be tracked at compile-time. For instance, depending on program and/or hardware characteristics, the dynamic compiler may enable page-level, memory-word, and/or cache-line tracking for enregistered memory locations. Hence, the compiler can flexibly adjust the granularity of tracking for enregistered memory locations based on variations in workload and/or computing devices.

6. Variations

As mentioned above, in some embodiments of the present invention, the system may undo an enregistering optimization and rewrite a modified instruction to no longer use an available register (and instead revert to using load and/or store instructions). For instance, the system may determine that due to spatial locality of memory accesses, an enregistered memory location accessed once by a non-owning thread is likely to be accessed again by such a thread. In such a scenario, the system may determine that the repeated overhead involved in flushing the register value is higher than the performance improvements associated with using the register. At this point, the system may use the register to enregister another unrelated candidate memory location, or simply choose to leave the register unused.

In some embodiments of the present invention, the system may provide "write-through" semantics for an enregistered memory location by automatically flushing values written to the associated register to the memory location. Automatically flushing such values ensures that later reads of the memory location will not incur additional delays from the store operation by guaranteeing that such values will always be up-to-date, thereby providing faster access to the value for other threads. Furthermore, such write-through operations allow the system to use registers more flexibly (e.g., by allowing the system to use the register for another operation without having to issue and wait for a store operation).

Note that the described techniques for enregistering memory locations are distinct from techniques that use special memory regions to store register values from prior activation records. While such techniques allow indirect access to an unbounded number of virtual "registers" (which may be located either in a register window or in main memory), they do not involve changes in the actual number of hardware registers actually available to a program, and hence do not improve program performance. In contrast, the described techniques permit memory values to reside in additional available registers and enable multi-threaded use of enregistered values while preserving memory model semantics.

In one embodiment of the present invention, the described techniques facilitate performing multiple updates atomically by allowing values to be placed in registers, updated, and then flushed back to memory when another thread attempts to read them. Note that the described techniques do not limit the execution region in which such "atomic" operations take place (e.g., to a specified shared memory region), and are not susceptible to failed or delayed writes that may occur due to contention for such shared memory locations in transactional memory systems.

7. Computing Environment

In some embodiments of the present invention, the described techniques can be incorporated into and/or accessed by a wide range of computing devices in a computing environment. For instance, virtual machines may be implemented on a range of computing devices, and guest programs may be transferred between such computing devices. Furthermore, computing devices may be based on a range of architectures that benefit from different techniques for tracking enregistered memory locations.

Figure 8:
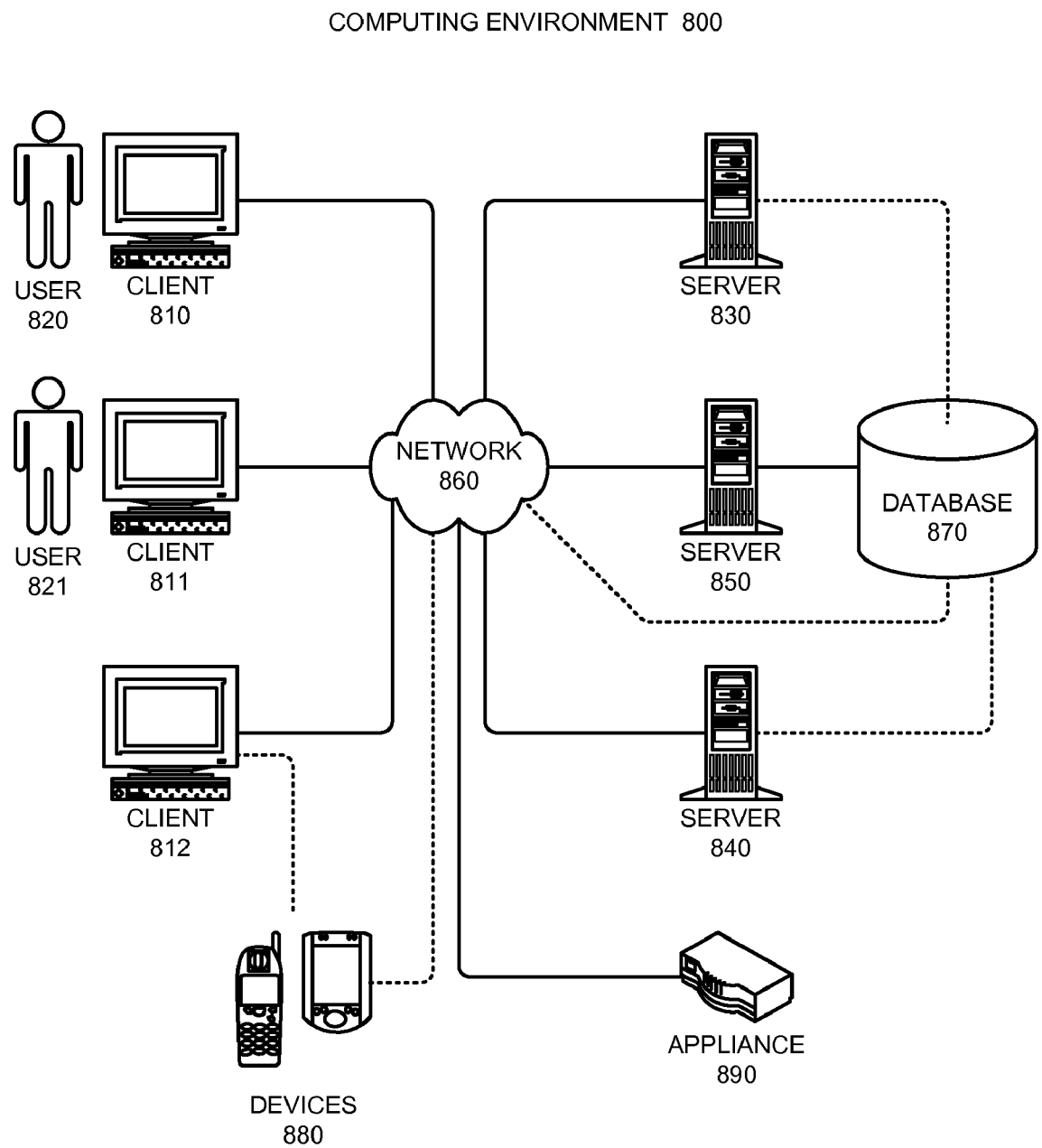
FIG. 8 illustrates a computing environment in accordance with an embodiment of the present invention.

FIG. 8 illustrates a computing environment 800 in accordance with an embodiment of the present invention. Computing environment 800 includes a number of computer systems, which can generally include any type of computer system based on a single-core or multi-core microprocessor, a symmetric multiprocessor, a mainframe computer, a digital signal processor, a portable computing device, a personal organizer, a device controller, or a computational engine within an appliance. More specifically, referring to FIG. 8, computing environment 800 can include clients 810-812, users 820-821, servers 830-850, network 860, database 870, devices 880, and appliance 890.

Clients 810-812 can include any node on a network including computational capability and including a mechanism for communicating across the network. Additionally, clients 810-812 may comprise a tier in an n-tier application architecture, wherein clients 810-812 perform as servers (servicing requests from lower tiers or users), and wherein clients 810-812 perform as clients (forwarding the requests to a higher tier).

Similarly, servers 830-850 can generally include any node on a network including a mechanism for servicing requests from a client for computational and/or data storage resources. Servers 830-850 can participate in an advanced computing cluster, or can act as stand-alone servers. In one embodiment of the present invention, server 840 is an online "hot spare" of server 850.

Users 820 and 821 can include: an individual; a group of individuals; an organization; a group of organizations; a computing system; a group of computing systems; or any other entity that can interact with computing environment 800.

Network 860 can include any type of wired or wireless communication channel capable of coupling together computing nodes. This includes, but is not limited to, a local area network, a wide area network, or a combination of networks. In one embodiment of the present invention, network 860 includes the Internet. In some embodiments of the present invention, network 860 includes phone and cellular phone networks.

Database 870 can include any type of system for storing data in non-volatile storage. This includes, but is not limited to, systems based upon magnetic, optical, or magneto-optical storage devices, as well as storage devices based on flash memory and/or battery-backed up memory. Note that database 870 can be coupled: to a server (such as server 850), to a client, or directly to a network. In some embodiments of the present invention, database 870 is used to store information related to virtual machines and/or guest programs. Alternatively, other entities in computing environment 800 may also store such data (e.g., servers 830-850).

Devices 880 can include any type of electronic device that can be coupled to a client, such as client 812. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments of the present invention, devices 880 can be coupled directly to network 860 and can function in the same manner as clients 810-812.

Appliance 890 can include any type of appliance that can be coupled to network 860. This includes, but is not limited to, routers, switches, load balancers, network accelerators, and specialty processors. Appliance 890 may act as a gateway, a proxy, or a translator between server 840 and network 860.

Note that different embodiments of the present invention may use different system configurations, and are not limited to the system configuration illustrated in computing environment 800. In general, any device that is capable of receiving a guest program, executing a guest program in a virtual machine, and/or tracking an enregistered memory location may incorporate elements of the present invention.

Figure 9:
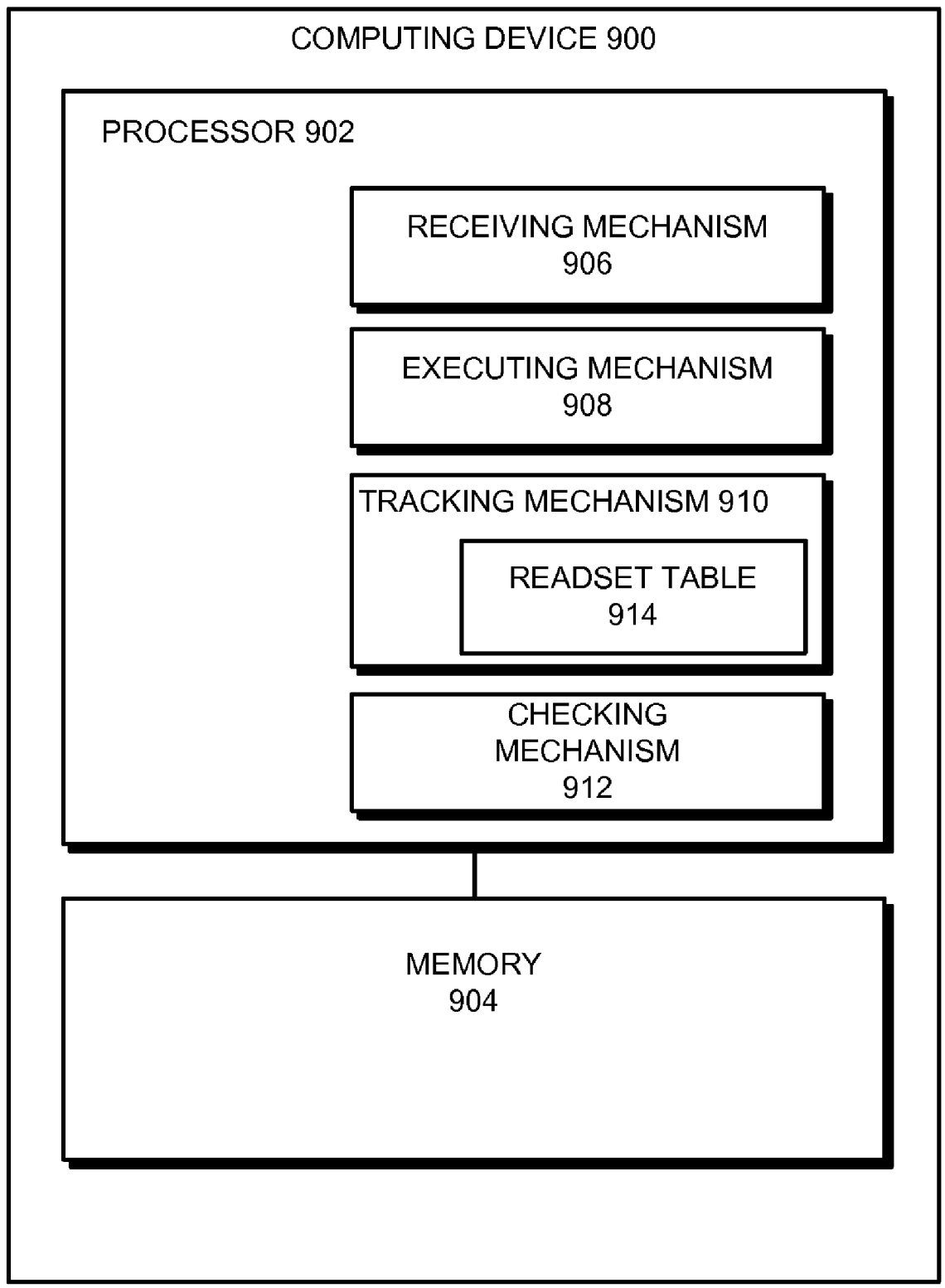
FIG. 9 illustrates a computing device that includes a readset table in accordance with an embodiment of the present invention.

FIG. 9 illustrates a computing device 900 that tracks enregistered memory locations in accordance with an embodiment of the present invention. Computing device 900 includes processor 902 and memory 904. Processor 902 includes receiving mechanism 906, executing mechanism 908, tracking mechanism 910, and checking mechanism 912. Tracking mechanism 910 also includes readset table 914, which is used to identify and track enregistered memory locations. During operation, receiving mechanism 906 receives object code for a program that enregisters a memory location, where the memory location is associated with a memory address. Executing mechanism 908 executes this object code using a thread. During execution, tracking mechanism 910 tracks the memory address and a thread identifier associated with the thread in readset table 914. Checking mechanism 912 checks readset table 914 during memory accesses to ensure that other threads attempting to access the enregistered memory location receive a current value for the enregistered memory location.

In some embodiments of the present invention, some or all aspects of receiving mechanism 906, executing mechanism 908, tracking mechanism 910, checking mechanism 912, and readset table 914 can be implemented as dedicated hardware modules in processor 902. For example, processor 902 can include one or more specialized circuits for performing the operations of the mechanisms. Alternatively, some or all of the operations of receiving mechanism 906, executing mechanism 908, tracking mechanism 910, checking mechanism 912, and readset table 914 may be performed using general purpose circuits in processor 902 that are configured using processor instructions.

Although FIG. 9 illustrates receiving mechanism 906, executing mechanism 908, tracking mechanism 910, checking mechanism 912, and readset table 914 as being included in processor 902, in alternative embodiments some or all of these mechanisms are external to processor 902. For instance, these mechanisms may be incorporated into hardware modules external to processor 902. These hardware modules can include, but are not limited to, processor chips, application-specific integrated circuit (ASIC) chips, field-programmable gate arrays (FPGAs), memory chips, and other programmable-logic devices now known or later developed.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, program code, etc.) that configures the general-purpose circuits to perform the operations described above.

In summary, some embodiments of the present invention leverage additional available registers following a binary translation of object code to a different hardware implementation. The system rewrites instructions to replace memory accesses with register accesses while maintaining the memory model semantics of the original program. The system tracks memory accesses to determine whether such accesses are to enregistered memory locations and, if so, ensures that an attempt by a thread to access a value from the enregistered memory location flushes the current value from the register back into the memory location. The system can track enregistered memory locations using both page-level and finer-granularity tracking techniques. By transforming a number of frequent memory accesses into register accesses, the system improves program performance by reducing the amount of memory traffic (e.g., reducing the memory bandwidth used) and significantly reducing the associated memory latency.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for tracking enregistered memory locations, comprising:
   receiving object code for a program that has been compiled to execute using a register set associated with a first hardware implementation;
   translating the object code to execute on a second hardware implementation, wherein the second hardware implementation includes more registers than the register set of the first hardware implementation;
   identifying a memory access in the object code, wherein the memory access accesses a memory location, and wherein the memory location is associated with a memory address;
   rewriting one or more instructions associated with the memory access to access an available register instead of the memory location;

executing the object code using a thread;

tracking the memory address and a thread identifier associated with the thread in a table that identifies enregistered memory locations; and checking the table during memory accesses to ensure that other threads attempting to access the enregistered memory location receive a current value for the enregistered memory location.

2. The method of claim 1, wherein checking the table on a subsequent memory access involves:

identifying memory locations for subsequent memory accesses which are tracked in the table; and flushing enregistered memory values to the identified memory locations.

3. The method of claim 2, wherein the method further involves executing a special store instruction that allows the thread to bypass a trap handler to directly store an enregistered value to the memory location.

4. The method of claim 1, wherein checking the table on a subsequent memory access involves:

identifying memory locations for subsequent memory accesses which are tracked in the table; and determining whether thread identifiers associated with the identified subsequent memory accesses match the thread identifiers tracked in the table for the memory locations.

5. The method of claim 4, wherein if the tracked memory location matches the memory location associated with the subsequent memory access but the tracked thread identifier does not match the thread identifier associated with the subsequent memory access, the method further involves flushing the enregistered memory location to the memory location.

6. The method of claim 5, wherein flushing the enregistered memory location to the memory location involves one or more of the following:

triggering a trap that invokes a trap handler;

prompting the thread that has enregistered the memory location to flush the current value for the enregistered memory location to the memory location;

allowing a second thread that initiated the subsequent memory access to access the flushed value in the memory location, thereby allowing the subsequent memory access to complete; and re-enregistering the memory location for the original thread.

7. The method of claim 5, wherein flushing the enregistered memory location further involves no longer enregistering the memory location for subsequent program execution.

8. The method of claim 1, wherein the table is distributed across two or more processing units;

wherein entries in the table may be distributed or replicated across the two or more processing units; and wherein the method further involves checking the table for subsequent memory accesses on the two or more processing units.

9. The method of claim 8, wherein tracking the memory address and the thread identifier in the table further involves propagating the memory address and the thread identifier to additional processing units using an extension to a coherence messaging protocol.

10. The method of claim 1, wherein the method further involves using the table to protect access to enregistered memory locations at the granularity of a memory word or a cache line.

11. The method of claim 10, wherein the described method is used in conjunction with techniques that provide page-level protection for enregistered memory locations, thereby facilitating the protection of enregistered memory locations for a range of memory granularities.

12. The method of claim 1, wherein executing the object code comprises executing the object code using a new target architecture, wherein the object code is generated for an intended target architecture that is different from the new target architecture, wherein a feature set for the new target architecture comprises a set of registers and one or more additional registers, wherein a feature set for the intended target architecture comprises the set of registers but does not comprise the one or more additional registers, and wherein enregistering a memory location comprises using the one or more additional registers to cache one or more frequently used memory locations while the object code is executing using the new target architecture.

13. A non-transitory computer-readable storage medium storing instructions that when executed by a computer cause the computer to perform a method for tracking enregistered memory locations, the method comprising:

receiving object code for a program that has been compiled to execute using a register set associated with a first hardware implementation;

translating the object code to execute on a second hardware implementation, wherein the second hardware implementation includes more registers than the register set of the first hardware implementation;

identifying a memory access in the object code, wherein the memory access accesses a memory location, and wherein the memory location is associated with a memory address;

rewriting one or more instructions associated with the memory access to access an available register instead of the memory location;

executing the object code using a thread;

tracking the memory address and a thread identifier associated with the thread in a table that identifies enregistered memory locations; and checking the table during memory accesses to ensure that other threads attempting to access the enregistered memory location receive a current value for the enregistered memory location.

14. A computing device that includes a processor that facilitates tracking enregistered memory locations, wherein the processor comprises:

receiving object code for a program that has been compiled to execute using a register set associated with a first hardware implementation;

translating the object code to execute on a second hardware implementation, wherein the second hardware implementation includes more registers than the register set of the first hardware implementation;

identifying a memory access in the object code, wherein the memory access accesses a memory location, and wherein the memory location is associated with a memory address;

rewriting one or more instructions associated with the memory access to access an available register instead of the memory location;

executing the object code using a thread;

tracking the memory address and a thread identifier associated with the thread in a table that identifies enregistered memory locations; and checking the table during memory accesses to ensure that other threads attempting to access the enregistered memory location receive a current value for the enregistered memory location.

15. The computing device of claim 14, wherein the checking mechanism is further configured to:
  identify memory locations for subsequent memory accesses which are tracked in the table; and
  flush enregistered memory values to the identified memory locations.

16. The computing device of claim 15, wherein the processor supports a special store instruction that when executed bypasses a trap handler to directly store an enregistered value to the memory location.

17. The computing device of claim 14, wherein the checking mechanism is further configured to:
  identify memory locations for subsequent memory accesses which are tracked in the table; and
  determine whether thread identifiers associated with the identified subsequent memory accesses match the thread identifiers tracked in the table for the memory locations.

18. The computing device of claim 17, wherein if the tracked memory location matches the memory location associated with the subsequent memory access but the tracked thread identifier does not match the thread identifier associated with the subsequent memory access, the checking mechanism is further configured to flush the enregistered memory location to the memory location.

19. The computing device of claim 14,
  wherein the table is distributed across two or more processing units;
  wherein entries in the table may be distributed or replicated across the two or more processing units; and
  wherein the checking mechanism is further configured to check the table for subsequent memory accesses on the two or more processing units.

* * * * *